United States Patent [19]

Medlin et al.

[11] Patent Number: 4,715,019
[45] Date of Patent: Dec. 22, 1987

[54] BOREHOLE LOGGING METHOD FOR DETERMINING THE DAMPING OF ACOUSTIC TUBE WAVES IN SUBSURFACE FORMATIONS ALONG A BOREHOLE WALL

[75] Inventors: William L. Medlin; Gary L. Zumwalt, both of Dallas, Tex.

[73] Assignee: Mobil Oil Corporation, New York, N.Y.

[21] Appl. No.: 822,504

[22] Filed: Jan. 27, 1986

[51] Int. Cl.$^4$ ............................................. G01V 1/28
[52] U.S. Cl. ................................................. 367/31
[58] Field of Search ...................... 367/28, 29, 30, 31, 367/32, 33, 34, 35, 75, 86; 181/102, 103, 104, 105, 106, 112; 364/422

[56] References Cited

U.S. PATENT DOCUMENTS

| Re. 24,446 | 3/1958 | Summers | 181/0.5 |
|---|---|---|---|
| 3,333,238 | 7/1967 | Caldwell | 340/18 |
| 3,362,011 | 1/1968 | Zemanek, Jr. | 340/18 |
| 3,363,118 | 1/1968 | Sims | 310/8.7 |
| 4,123,744 | 10/1978 | Ingram | 367/29 |
| 4,383,308 | 5/1983 | Caldwell | 367/31 |
| 4,432,077 | 2/1984 | Alhilali et al. | 367/31 |
| 4,450,540 | 5/1984 | Mallett | 367/31 X |
| 4,578,828 | 3/1986 | Williams | 367/31 |

FOREIGN PATENT DOCUMENTS

| 1152201 | 8/1983 | Canada | 349/8 |
|---|---|---|---|
| 0127548 | 5/1984 | European Pat. Off. | 367/35 |
| 3406445 | 8/1985 | Fed. Rep. of Germany | 367/27 |

OTHER PUBLICATIONS

Huang et al., The Correlation of "Tube Wave" Events with Open Fractures ... Part A, Geological Survey of Canada, Paper 81-1A, 1981, pp. 361-376.

Aron et al., Formation Compressional and Shear Wave Internal-Transittime Logging, Soc. Petroleum Engineers, 10/78, pp. 1-11.

C. A. Sheridan et al., "Bender Bar Transducers for Low-Frequency Underwater Sound Sources", 97th Mtg., Acoustical Society of America, Cambridge, Mass., 6/15/79.

*Primary Examiner*—Donald P. Walsh
*Assistant Examiner*—Brian S. Steinberger
*Attorney, Agent, or Firm*—Alexander J. McKillop; Michael G. Gilman; George W. Hager, Jr.

[57] ABSTRACT

A borehole logging tool employs an acoustic transmitter and at least one spaced-apart receiver. The transmitter is excited with a tone burst to cause the transmitter to resonate and generate acoustic tube waves. The rate of decay of the amplitudes of the tube waves recorded at the receiver following termination of the excitation of the transmitter is used to determine the amount of damping of the tube waves in the subsurface formation along the borehole wall.

3 Claims, 8 Drawing Figures

COMPRESSIONAL / TUBE WAVE GENERATION

BOREHOLE LOGGING METHOD FOR DETERMINING THE DAMPING OF ACOUSTIC TUBE WAVES IN SUBSURFACE FORMATIONS ALONG A BOREHOLE WALL

BACKGROUND OF THE INVENTION

It has long been known to log open boreholes to measure acoustic wave energy traveling through rock formations located in the borehole region. Logging devices have been used for this purpose which normally comprise a sound source (transmitter) and one or more receivers disposed at preselected distances from the sound source. By measuring the travel of such acoustic waves between the transmitter and one or more receivers, it is normally possible to determine the nature of surrounding rock formations. In logging loosely consolidated formations, however, it is often difficult to distinguish between compressional, shear, tube and secondary waves which may comprise portions of a wave train arriving at a given receiver. The use of remotely spaced, multiple receivers is thus intended to aid in distinguishing between arriving wave fronts and noise in the system. Multiple receivers permit the recognition of similar wave patterns and wave fronts which are received at each successive receiver. Since travel time differentials increase with increasing distance from the transmitter source, wave fronts and patterns which are closely spaced at proximate receiver locations will separate by the time of their receipt at remote receiver locations.

Various signal timing and wave front analysis methods have also been suggested for distinguishing between wave fronts received at a given receiver. Most of these methods involve timing circuits which anticipate the receipt of, and facilitate the collection of, such wave front information. For descriptions of various logging techniques for collecting and analyzing compressional wave, shear wave, tube wave, and secondary wave data, please refer to U.S. Pat. No. 3,333,238 (Caldwell), U.S. Pat. No. 3,362,011 (Zemanek, Jr.), Reissue U.S. Pat. No. 24,446 (Summers), and U.S. Pat. No. 4,383,308 (Caldwell).

In the design of logging tools, various types of transmitters, such as piezoelectric or magnetostrictive transmitters, have been suggested for creating acoustic logging signals. For conventional logging operations, most such transmitters have been centrally located in the borehole and have been adapted to generate sound which is radiated in a multidirectional (360°) pattern from the transmitter to adjacent wellbore surfaces.

Recently, attention has been directed to developing transmitters which are particularly suited to a single point force application of acoustic energy to the borehole wall. The theory behind point force transmitters is that they produce an asymmetrical acoustic energy radiation pattern as contrasted with the multidirectional radiation pattern. One such point force transmitter is the bender-type disclosed in Canadian Pat. No. 1,152,201 (Angona and Zemanek).

SUMMARY OF THE INVENTION

The present invention is directed to an acoustic well logging method for determining the damping of acoustic energy in a subsurface formation surrounding a borehole. The borehole is traversed with a well logging tool containing an acoustic transmitter and at least one spaced-apart receiver. The transmitter is excited with a tone burst during an initial portion of a fixed time period to cause the transmitter to resonate and generate acoustic tube waves. This excitation of the transmitter is removed during a terminal portion of the fixed time period, whereby the amplitudes of the tube waves build up to a steady-state value during the initial portion of the fixed time period and decay from that value over the terminal portion of the fixed time period. The amplitudes of the tube waves are recorded at the receiver at least during the terminal portion of the fixed time period. Damping of the tube waves in the subsurface formation along the borehole wall is determined from the rate of decay of the recorded tube waves.

In a more specific aspect, the damping of the tube waves is determined by (i) plotting the logarithm of the amplitude peak of each cycle of the tube waves against the cycle number over some portion of the recorded tube waves, (ii) determining the value of the negative inverse of the slope of such logarithmic plot, and (iii) multiplying the value of the negative inverse of such slope by $\pi$.

In a further aspect, the transmitter may be excited for a plurality of successive time periods and the amplitudes of the tube waves recorded at the receiver over such plurality of time periods stacked. The rate of decay of the tube waves are then determined from the slope of a logarithmic plot of the stacked amplitudes.

In a still further aspect, a plurality of receivers are equally spaced along the borehole, and the tube wave recorded at the receiver located nearest a tube wave antinode point, where the tube wave amplitude is greatest, is used in determining tube wave damping.

DESCRIPTION OF THE PREFERRED EMBODIMENT

In accordance with the present invention, there is provided a well logging method for determining the damping of acoustic tube waves in a subsurface formation along a borehole wall. Such damping is a measure of Q, sometimes called "quality factor", of the formation surrounding the borehole. More particularly, it is the Q of a formation which determines how rapidly an acoustic wave will be damped as it travels through the formation.

Figure 1:
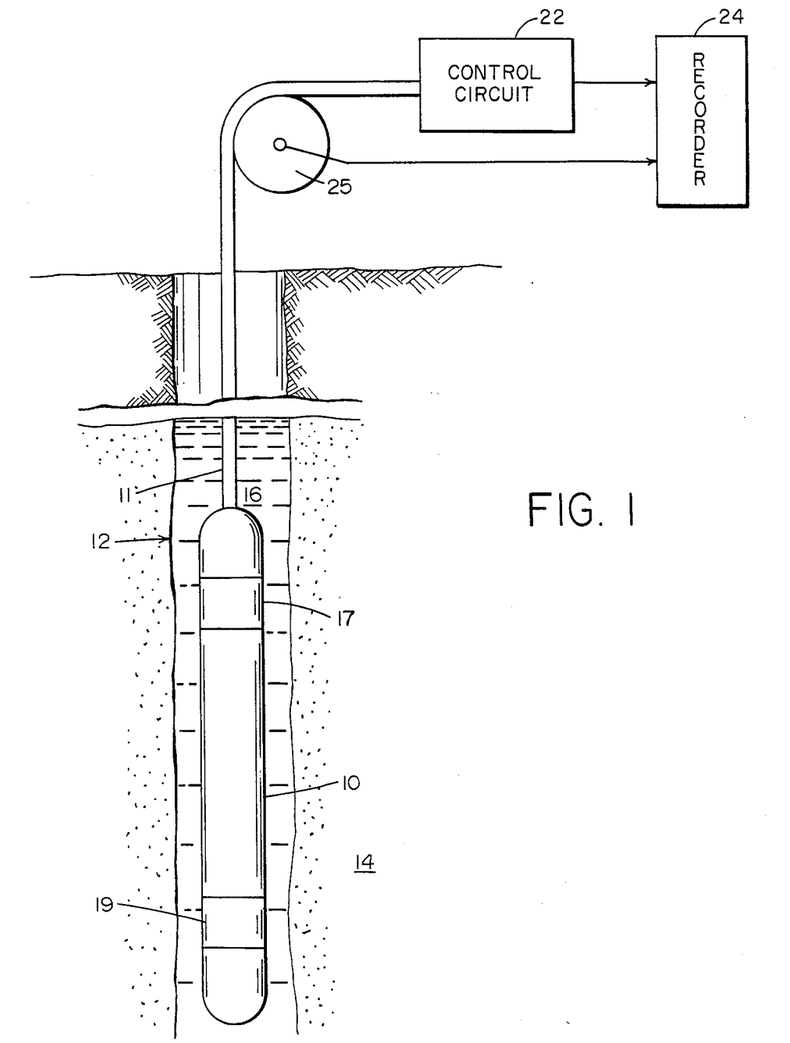
FIG. 1 is a schematic illustration of an acoustic borehole logging system useful in carrying out the method of the present invention.

A well logging tool for carrying out the tube wave damping measurement of the present invention in a subsurface formation surrounding a borehole is shown in FIG. 1. The logging system includes an elongated logging tool 10 which is suspended from a cable 11 within a borehole 12 which traverses a subterranean formation of interest indicated by reference character 14. Formation 14 may be a suspected oil- or gas-bearing formation which is to be characterized in regard to its porosity, fluid saturation, or such other information as may be desired. The well 12 is filled with a liquid, such as drilling mud, indicated by reference numeral 16. The logging tool 10 comprises an acoustic transmitter 17 and at least one acoustic receiver 19. Transmitter 17 preferably takes the form of either a bender-type or a flexure disc-type transducer, as described in greater detail hereinafter, and receiver 19 may be any of several type hydrophones or ceramic cylinder devices used in conventional sonic logging tools.

Signals from the logging tool 10 are transmitted uphole by the conductors in cable 11 to any suitable utilization system at the surface. For example, the utilization system is illustrated as comprising an uphole analysis and control circuit 22 and recorder 24 in order that the output from circuit 22 may be correlated with depth.

The logging tool may be moved through the well at any suitable rate while it is operated to generate and receive the acoustic pulses. Typically, the tool will be lowered to the bottom of the interval to be logged and then pulled upwardly during the logging measurements at a speed of at least 20 feet per minute. Somewhat greater logging speeds, e.g., 60 feet per minute, normally can be used.

Figure 2:
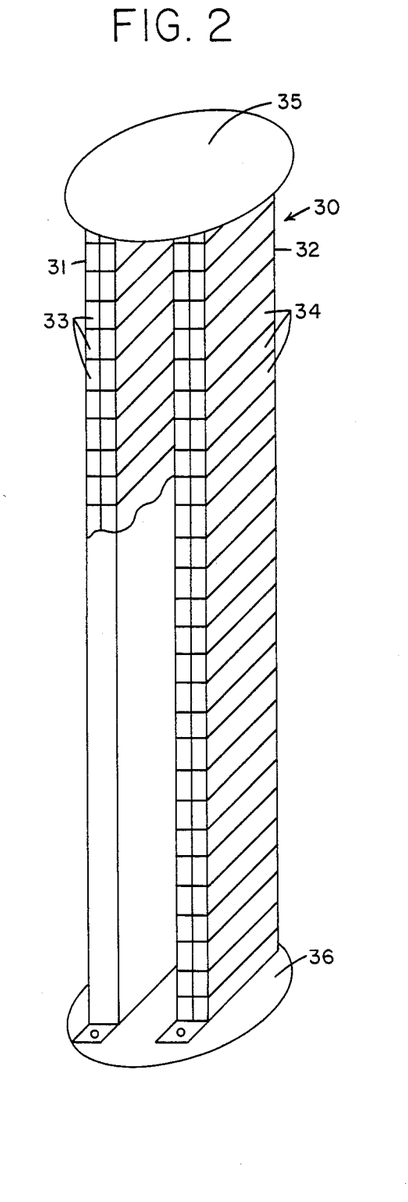
FIGS. 2 and 3 illustrate the configuration and action, respectively, of the transmitter of the acoustic borehole logging system of FIG. 1.

As noted previously, acoustic pulses are produced in accordance with the present invention by means of a bender-type or a flexure disc-type transducer. Bender-type transducers are, in themselves, well known and take the form described by Sheridan, C. A., et al., in "Bender Bar Transducers For Low-Frequency Underwater Sound Sources", presented at the 97th Meeting of the Acoustical Society of America, Cambridge, Mass., June 15, 1979. Such a transducer is available commercially from Honeywell Defense Electronics Division, Seattle, Wash., as model HX-8B with resonances at 0.5 and 1.2 kHz and from Actran Systems, Orlando, Fla., as the flexure disc source with a resonance at 1.2 kHz. Turning now to FIG. 2, there is illustrated an enlarged view of a bender-type transducer utilized as the transmitter 17 of FIG. 1. Such a transducer 30 comprises a pair of bender bars 31 and 32. Bar 31 is comprised of a mosaic configuration of smaller individual bars 33, and bar 32 is similarly comprised of a plurality of individual bars 34. The two bars 31 and 32 are mounted between common support members 35 and 36. This type construction permits the bars to be driven at a plurality of frequencies to give a good quality sine wave output as compared to the larger plate-type bender transducers.

Figure 3:
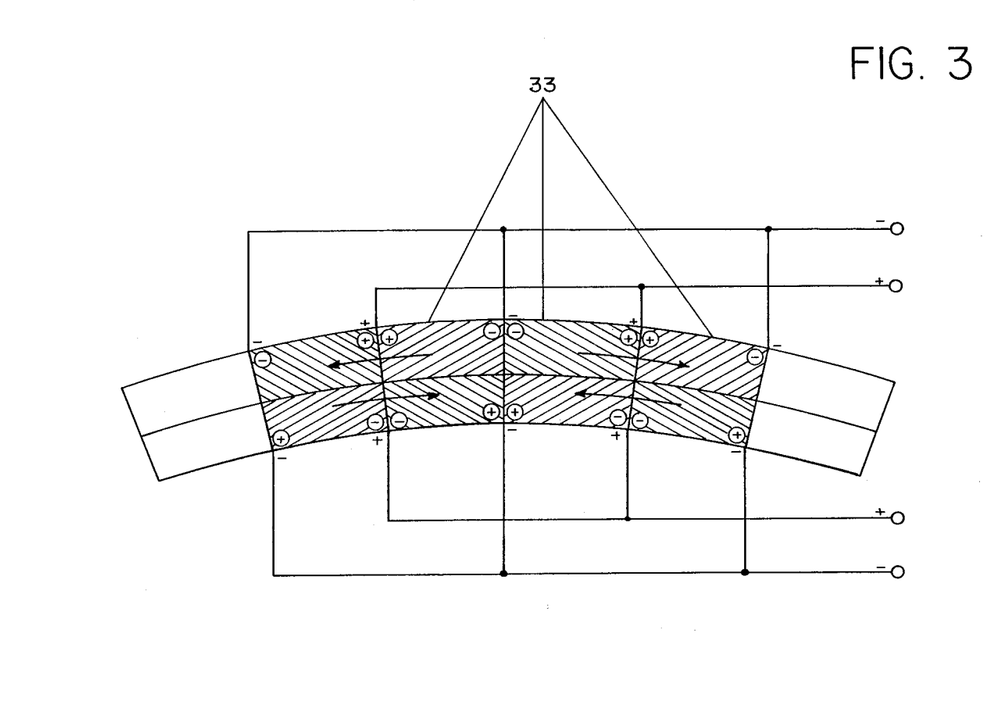

The bender-principles of the bender-type transducer are shown in detail in FIG. 3. The bending action of bars 31 and 32 arises from the direction of polarization of each individual bar 33 and 34 with respect to adjacent bars 33 and 34, as indicated by the arrows. As shown diagrammatically in FIG. 4, the two piezoelectric elements flex outward and inward together to produce a compressional and/or tube wave in the wellbore. Such a bender-type transmitter is designed to have a number of characteristic resonant frequencies between a few hundred Hz and several kHz, such as from about 100 Hz to about 50 kHz. In response to the application of an alternating current of fixed frequency, the transmitter will resonate at a single one of such characteristic resonant frequencies. It has been found that the particular range of characteristic frequencies utilized controls the vibrational mode generated in a formation. A dominant tube wave mode of vibration was observed below about 1.5 kHz in one acoustic logging operation employing a Honeywell HX8-B bender-type transducer, energized as shown in the following TABLE, and with a single receiver spaced 15 feet from the transmitter.

TABLE

| Transmitter Freq. (kHz) | Compressional Wave Freq. (kHz) | Tube Wave Freq. (kHz) |
| --- | --- | --- |
| 0.4 | — | 0.4 |
| 0.5 | — | 0.5 |
| 1.0 | — | 1.0 |
| 1.5 | — | 1.2 |
| 3.6 | 3.3 | — |
| 5.9 | 3.3 | — |
| 8.5 | 3.5 | — |
| 10.0 | 3.4 | 1.1 |
| 12.5 | 3.7 | 1.0 |
| 15.5 | 3.6 | — |
| 30.0 | 3.5 | — |

It can be seen from the TABLE that the tube wave frequency is about equal to the driving frequency of the transmitter below about 1.5 kHz. A compressional wave was observed between about 1.5 kHz and 10 kHz, and both a tube wave and a compressional wave were observed above about 10 kHz.

As noted above, a flexure disc-type transducer may be utilized in the low frequency acoustic transmitter 17. A particularly suitable flexure disc-type transducer is the radially driven flexural plate device described in U.S. Pat. No. 3,363,118 to C. C. Sims, the teaching of which is incorporated herein by reference.

In carrying out the method of the present invention for measuring tube wave damping of a subsurface formation, the transmitter is driven by a tone burst rather than the conventional single impulse. This tone burst is preferably a sine wave driving current. Commercial devices are available for generating sine wave tone bursts, such as a Model 7060 Generator, supplied by Exact Electronics, Hillsboro, Oreg., with a Model MC 2500 Power Amplifier, supplied by McIntosh Laboratory, Binghamton, N.Y. Amplitudes are in the range of 100–150 volts RMS. This voltage is sufficient for generating acoustic source levels from the transmitter which will provide detectable acoustic signals in conventional, long-spaced receivers in borehole logging tools.

Figures 4, 5:
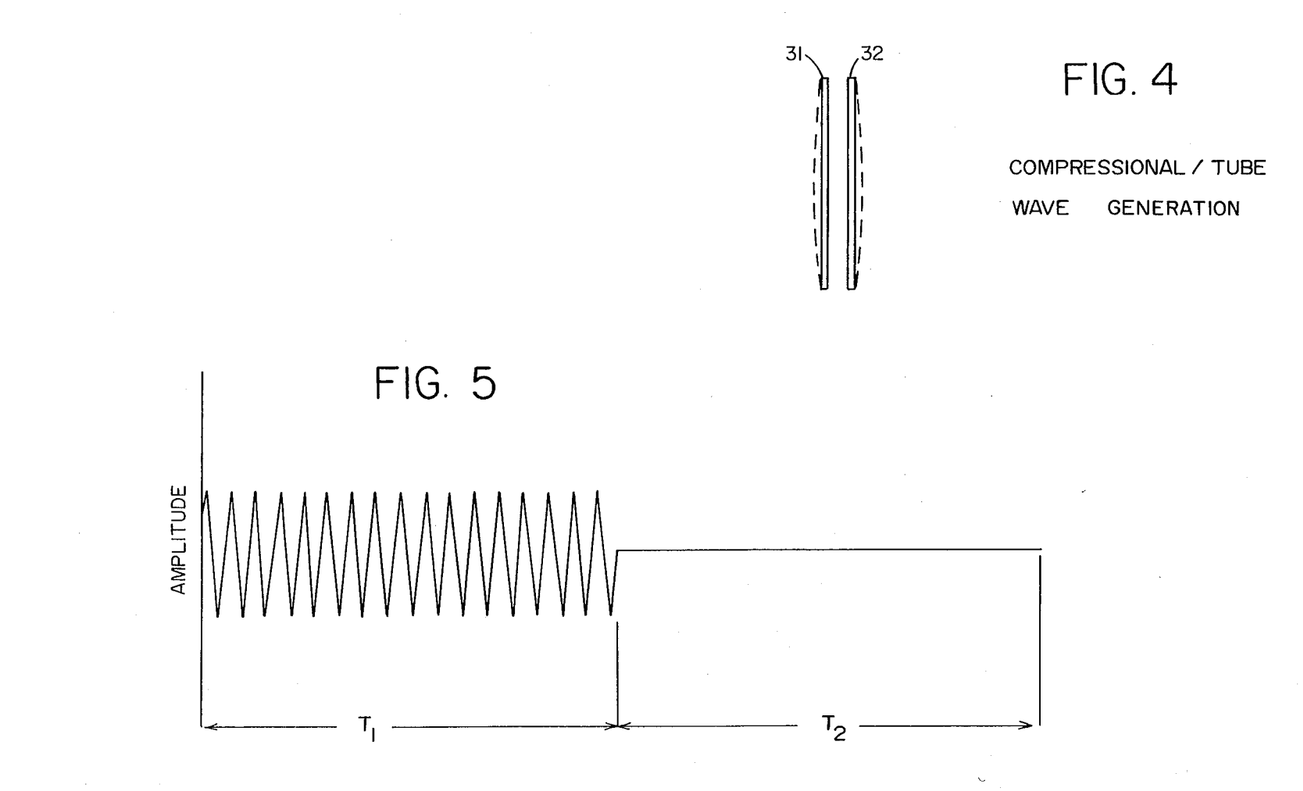
FIG. 4 is a diagrammatic illustration of the use of the transmitter of FIG. 1 in generating tube waves.
FIG. 5 illustrates a sine wave tone burst useful in exciting the acoustic transmitter of FIG. 1.

Such a typical sine wave tone burst is illustrated in FIG. 5. This tone burst excitation of the transmitter results in the generation of a tube wave which arrives at the receiver in the form illustrated in FIG. 6. Over an initial portion $T_1$ of a fixed time period, the transmitter is continually excited by the steady-state sine wave tone burst of FIG. 5. During this same initial portion of $T_1$, the received tube wave builds up to a steady-state amplitude. After the sine wave tone burst is terminated, the received tube wave decays over a terminal portion $T_2$ of the fixed time period.

Figure 6:
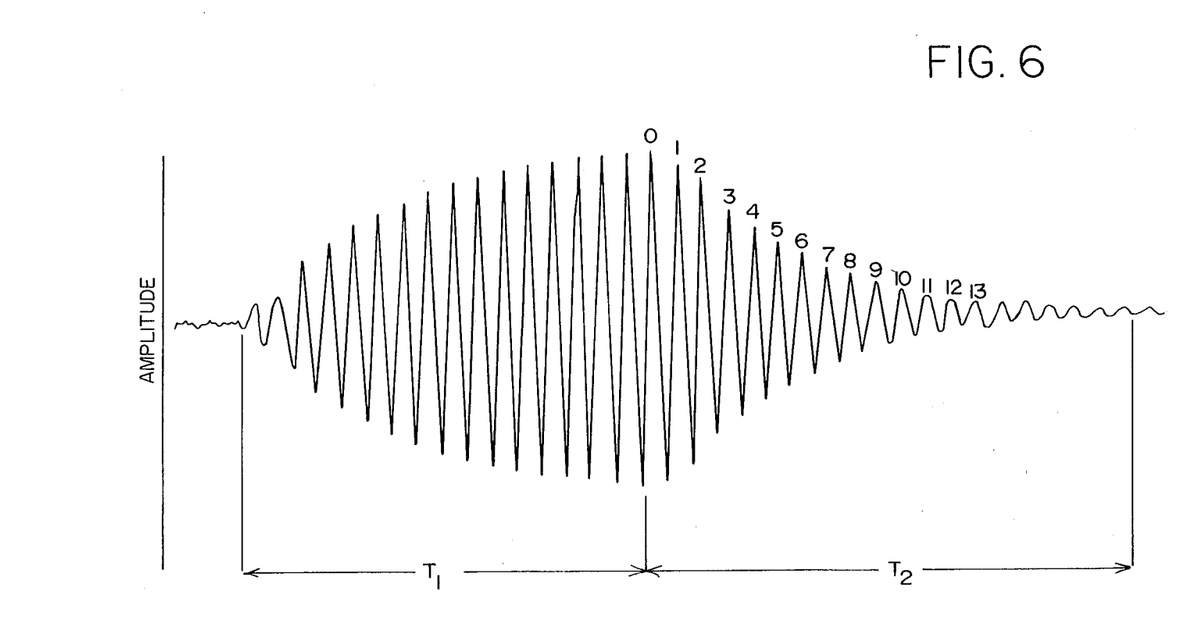
FIG. 6 illustrates an acoustic tube wave recorded at the receiver of FIG. 1 in response to the sine wave tone burst of FIG. 5.

Preferably, initial portion $T_1$ and terminal portion $T_2$ of the fixed time period are both in the order of 20–25 milliseconds. Thus, a fixed time period of about 40–50 milliseconds is required to record a tube wave trace as shown in FIG. 6. This allows for a repetition rate of about 20 tube wave trace recordings per second. Using conventional stacking methods, a stacked trace can be recorded in digital form at wellbore intervals of one foot with conventional logging speeds of several thousand feet per hour. The steady-state wave of FIG. 6 has the characteristics of a standing wave at distances not far from the transmitter. The response of the receiver has a fixed phase with respect to the transmitted wave. When the driving tone burst ends, the amplitude of the response at the receiver decays exponentially as a standing wave would.

The formation Q can be determined from the tube wave trace of FIG. 6 by treating it as a standing tube wave and invoking simple harmonic oscillator theory. Energy lost by radiation along the wellbore is neglected. There is no radiation loss away from the wellbore since tube wave energy is radially confined by the wellbore surface. The decay in amplitude starting with the 0th cycle of FIG. 6 can be fitted to the well-known equations of motion for a damped harmonic oscillator $$m\ddot{x} + c\dot{x} + kx = 0 \tag{1}$$

The solution of equation (1) has the form $$x = Ae^{-\frac{c}{2m}t} \cos(\Omega t + \phi) \tag{2}$$

where $$\Omega = \frac{k}{m} - \left(\frac{c}{2m}\right)^2 \tag{3}$$

and $\phi$ is a phase angle.

Equation (2) expresses the amplitude of vibration of a simple harmonic oscillator under the action of a damping force $c\dot{x}$. As a first approximation, it describes the decay of a standing tube wave under the action of damping associated with Q. Maxima in x occur over equal intervals of t which are the same as the period T of the oscillator. It can further be shown that the relation between successive maxima is [J. P. den Hartog, "Mechanical Vibrations,". McGraw-Hill, New York (1940), p. 52]

$$x_{n+1} = x_n e^{-\pi c/m\Omega} \tag{4}$$

The amplitude ratio between successive maxima fits the relation $$-\log_e\left(\frac{x_{n+1}}{x_n}\right) = \frac{\pi c}{m\Omega} = \delta \tag{5}$$

where $\delta$ is the logarithmic decrement. It follows that $$\delta = \frac{\log_e x_n - \log_e x_s}{s - n} \tag{6}$$

where s and n are cycle numbers counted from the time of cutoff of the tone burst with s>n.

$$Q = \frac{m\Omega}{c} = \frac{\pi}{\delta} \tag{7}$$

According to equations (6) and (7), Q can be determined by plotting the logarithm of each amplitude peak against its cycle number over some range of cycles s–n. Q is the negative inverse of the slope of this plot multiplied by $\pi$.

Figure 7:
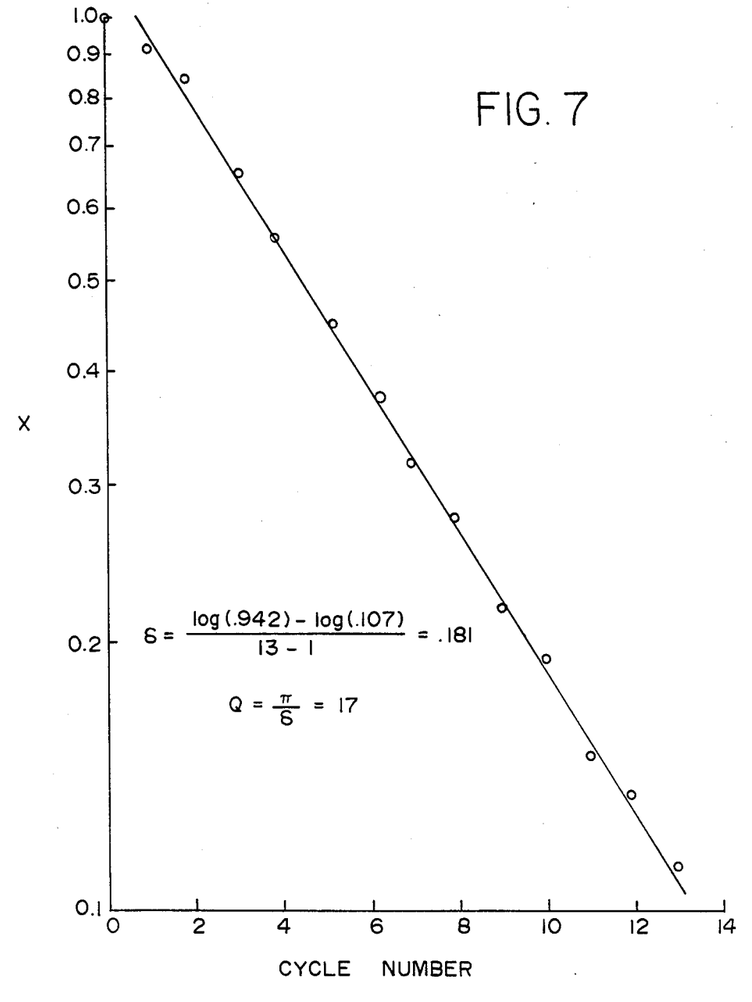
FIG. 7 is a logarithmic plot of each amplitude peak of the recorded tube wave of FIG. 6 versus cycle numbers.

FIG. 7 shows a logarithmic plot of this kind for the decay data of FIG. 6. The slope of this plot gives Q=17. In practical field operations, the receiver data are digitized on location and stored on magnetic tape. Q is determined by finding the best least-squares fit of the logarithmic data over a selected number of cycles.

Figure 8:
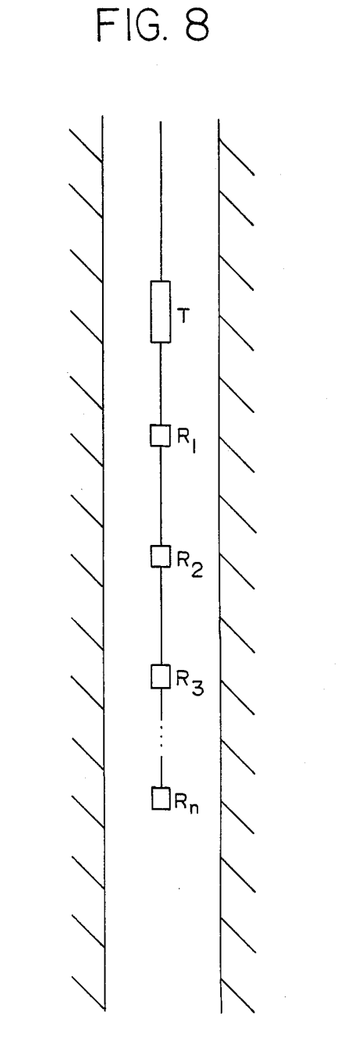
FIG. 8 illustrates the system of FIG. 1 including a plurality of equally spaced acoustic receivers.

The steady-state tube wave displays nodes and antinodes along the wellbore. Best results for the decay measurements are obtained at receiver locations nearest an antinode where the tube wave vibrations are largest. The antinodes will be located at integral numbers of half wavelengths above or below the transmitter. Wavelength varies along the wellbore in accordance with the relation $$\lambda = v/f \tag{8}$$

where $\lambda$ is wavelength, v velocity, and f the frequency of the steady-state tube wave. Since f is constant throughout a logging trip, $\lambda$ is proportional to v. Typically, tube wave velocities fall in the range 2000–6000 ft/sec. Therefore, at frequencies near 1 kHz the half wavelength can vary over the range 1–3 ft. At lower frequencies the variations would be proportionally larger. To account for these effects, it is desirable to have an array of several equally spaced receivers, as in FIG. 8. A typical spacing would be between 0.5 and 1.0 foot. The receiver giving the largest tube wave amplitude can then be selected for the decay measurements.

Having now described the method of the present invention, it is to be understood that various modifications and alterations may be made without departing from the spirit and scope of the invention as set forth in the appended claims.

We claim:

1. An acoustic well logging method for determining the damping of acoustic energy in a subsurface formation surrounding a borehole, comprising the steps of:
   (a) traversing a borehole with a well logging tool containing an acoustic transmitter and at least one spaced-apart receiver,
   (b) exciting said transmitter with a steady-state sine wave tone burst during an initial portion of a fixed time period to cause said transmitter to resonate and generate acoustic tube waves,
   (c) removing the excitation of said transmitter during a terminal portion of said fixed time period, whereby amplitudes of said tube waves build-up to a steady-state value during said initial portion of said time period and decay from said value over a terminal portion of said time period,
   (d) recording the amplitudes of said tube waves at said receiver during at least the terminal portion of said time period,
   (e) determing an amplitude peak of each sine wave cycle of said tube waves,
   (f) determining a logarithm of said amplitude peaks,
   (g) generating a logarithmic plot of said amplitude peaks of said recorded tube waves,
   (h) determining a slope of said logarithmic plot of tube wave amplitudes,
   (i) determining a negative inverse of said slope of said logarithmic plot, and
   (j) multiplying said negative inverse of the slope of said logarithmic plot by $\pi$ (Pi) as a measure of damping of said tube waves in the subsurface formation along the borehole wall.

2. An acoustic well logging method for determining damping of acoustic energy in a subsurface formation surrounding a borehole, comprising the steps of:
 (a) traversing a borehole with a well logging tool containing an acoustic transmitter and a plurality of spaced-apart receivers,
 (b) exciting said transmitter with a steady-state sine wave tone burst during an intitial portion of a fixed time period to cause said transmitter to resonate and generate acoustic tube waves,
 (c) removing the excitation of said transmitter during a terminal portion of said fixed time period, whereby the amplitudes of said tube waves build-up to a steady-state value during said initial portion of said time period and decay from said value over a terminal portion of said time period,
 (d) recording an amplitude peak of each sine wave cycle of said tube waves at a plurality of spaced-apart receivers during the terminal portion of said time period,
 (e) selecting a receiver in said plurality of receivers which recorded waves having amplitudes larger than the amplitudes of tube waves recorded at the other of said receivers during the terminal portion of said time period, and identifying a receiver located nearest an antinode point of said tube wave along the borehole, and
 (f) determining damping of said tube waves in said formations from the decay of the amplitude of the tube waves from said selected receiver.

3. An acoustic well logging method for determining damping of acoustic energy in a subsurface formation surrounding a borehole, comprising the steps of:
 (a) traversing a borehole with a well logging tool containing an acoustic transmitter and a plurality of spaced-apart receivers,
 (b) exciting said transmitter with a steady-state sine wave tone burst during an initial portion of a fixed time period to cause said transmitter to resonate and generate acoustic tube waves,
 (c) removing the excitation of said transmitter during a terminal portion of said fixed time period, whereby amplitudes of said tube waves build-up to a steady-state value during said initial portion of said time period and decay from said value over a terminal portion of said time period,
 (d) recording an amplitude peak of each sine wave cycle of said tube waves at a plurality of spaced-apart receivers during the terminal portion of said time period,
 (e) selecting a receiver in said plurality of receivers which recorded waves having amplitudes larger than the amplitudes of tube waves recorded at the other of said receivers during the terminal portion of said time period, and
 (f) generating a logarithmic plot of the amplitude peaks of said recorded tube waves,
 (g) determining a value of a negative inverse of a slope of said logarithmic plot of tube wave amplitudes, and
 (h) multiplying said value of the negative inverse of the slope of said logarithmic plot by $\pi$(Pi).

* * * * *